United States Patent
Hirata et al.

(10) Patent No.: US 8,964,514 B2
(45) Date of Patent: Feb. 24, 2015

(54) PLASMON GENERATOR AND THERMALLY-ASSISTED MAGNETIC RECORDING HEAD HAVING THE SAME

(75) Inventors: Kei Hirata, Tokyo (JP); Ryo Hosoi, Tokyo (JP); Keita Kawamori, Tokyo (JP); Tetsuya Roppongi, Tokyo (JP)

(73) Assignee: TDK Corporation, Tokyo (JP)

( * ) Notice: Subject to any disclaimer, the term of this patent is extended or adjusted under 35 U.S.C. 154(b) by 72 days.

(21) Appl. No.: 13/568,542

(22) Filed: Aug. 7, 2012

(65) Prior Publication Data

US 2014/0043948 A1    Feb. 13, 2014

(51) Int. Cl.

| | |
|---|---|
| *G11B 11/24* | (2006.01) |
| *G11B 13/08* | (2006.01) |
| *G11B 5/31* | (2006.01) |
| *G02B 5/00* | (2006.01) |
| *G02B 6/122* | (2006.01) |

(52) U.S. Cl.
CPC .............. *G11B 13/08* (2013.01); *G11B 5/3133* (2013.01); *G02B 5/008* (2013.01); *G02B 6/1226* (2013.01)
USPC ..................... 369/13.33; 369/13.14; 428/815; 428/816

(58) Field of Classification Search
None
See application file for complete search history.

(56) References Cited

U.S. PATENT DOCUMENTS

| | | | | |
|---|---|---|---|---|
| 8,077,556 B2 * | 12/2011 | Komura et al. | ............ | 369/13.02 |
| 8,116,176 B2 * | 2/2012 | Kato et al. | ................ | 369/13.33 |
| 2010/0214685 A1 | 8/2010 | Seigler et al. | | |
| 2011/0205863 A1 * | 8/2011 | Zhao et al. | ................ | 369/13.33 |

FOREIGN PATENT DOCUMENTS

| | | |
|---|---|---|
| JP | 04-165085 A | 6/1992 |
| JP | 4007702 B2 | 11/2007 |
| JP | 2011-5353 A | 1/2011 |
| JP | 2011-141942 A | 7/2011 |
| JP | 2012-22768 A | 2/2012 |
| JP | 2012-113805 A | 6/2012 |

\* cited by examiner

*Primary Examiner* — Kevin Bernatz
(74) *Attorney, Agent, or Firm* — Posz Law Group, PLC

(57) ABSTRACT

A plasmon-generator of the invention is configured to include a first configuration member including a near-field light generating end surface; and a second configuration member joined and integrated with the first configuration member and not including the near-field light generating end surface. The first configuration member is configured to contain Au as a primary component and to contain any one or more elements selected from a group of Co, Fe, Sb, Nb, Zr, Ti, Hf, and Ta, and is configured so that a content percentage $X_1$ of the contained element is within a range between 0.2 at % or more and 2.0 at % or less. Thereby, thermostability, optical characteristic, and the process stability are satisfied. Also, heat dissipation and heat generation suppression effect are extremely superior.

14 Claims, 10 Drawing Sheets

PLASMON GENERATOR AND THERMALLY-ASSISTED MAGNETIC RECORDING HEAD HAVING THE SAME

BACKGROUND OF THE INVENTION

1. Field of the Invention

The present invention relates to a plasmon-generator that generates near-field light, a thermally-assisted magnetic recording head that irradiates the near-field light to a magnetic recording medium to decrease an anisotropic magnetic field (coercive force) of the magnetic recording medium and then records data, and a head gimbal assembly and a magnetic recording device to which the head is used.

2. Description of the Related Art

In the field of magnetic recording using a magnetic head and a magnetic recording medium, further performance improvements of thin film magnetic heads and magnetic recording media have been demanded in conjunction with a growth of high recording density of magnetic disk devices. For the thin film magnetic heads, composite type thin film magnetic heads that are configured with a configuration in which a magnetoresistive (MR) element for reading and an electromagnetic transducer element for writing are laminated are widely used.

A recording layer of the magnetic recording medium is a discontinuous medium in which magnetic nanoparticles gather and each of the magnetic nanoparticles has a single magnetic domain structure. In the recording layer of the magnetic recording medium structured as described above, one recording bit is configured by a plurality of magnetic nanoparticles. Therefore, in order to increase recording density, asperities at a border between adjacent recording bits need to be reduced by decreasing the size of the magnetic nanoparticles. However, there is a problem that reducing the magnetic nanoparticles in size leads to a decrease in the volume of the magnetic nanoparticles, resulting in a decrease in thermal stability of magnetization in the magnetic nanoparticles.

As a countermeasure against this problem, increasing magnetic anisotropy energy Ku of magnetic nanoparticles may be considered; however, the increase in Ku causes an increase in an anisotropic magnetic field (coercive force) of the recording layer of the magnetic recording medium. On the other hand, the upper limit of the writing magnetic field intensity for the thin film magnetic head is substantially determined by saturation magnetic flux density of a soft magnetic material configuring a magnetic core in the head. As a result, when the anisotropic magnetic field of the recording layer of the magnetic recording medium exceeds an acceptable value determined from the upper limit of the writing magnetic field intensity, it becomes impossible to write.

Currently, as a method to solve such a problem of thermal stability, a so-called thermally-assisted magnetic recording method has been proposed in which, while a recording layer of a magnetic recording medium formed of a magnetic material with large Ku is used, the recording layer of the magnetic recording medium is heated immediately before the application of the writing magnetic field so that the anisotropic magnetic field is reduced and the writing is performed.

For the thermally-assisted magnetic recording method, methods in which laser light is utilized as a method of heating the recording layer of the magnetic recording medium are common. Among the methods, a method (near-field light heat application) is being a main stream in which laser light propagating through a waveguide is coupled with a plasmon-generator through a buffer layer therebetween in a surface plasmon mode so that surface plasmon is excited on the plasmon-generator; the surface plasmon is guided to the vicinity of a recording portion of the magnetic recording medium; and the medium is heated by near-field light generated from an end part (near-field light generation part) of the plasmon-generator.

The plasmon-generator used for the heat application system described above includes a near-field light generation part that is positioned on an air bearing surface (ABS), which is an opposing surface, of the magnetic recording medium and that generates the near-field light. And a detail description of a phenomenon in the technology is given. When the light propagating through the waveguide totally reflects off an interface between the waveguide and the buffer layer, evanescent light penetrating to the buffer layer is generated, the evanescent light couples with collective oscillation of charge, which is surface plasmon, on the plasmon-generator, and the surface plasmon is excited on the plasmon-generator. The surface plasmon excited on the plasmon-generator propagates through a propagation part (such as an edge of the plasmon-generator and a convex part) to a near-field light generation part, and near-field light is generated from the near-field light generation part positioned on the surface opposing the magnetic recording medium.

According to this technology, since the light propagating through the waveguide is not directly irradiated to the plasmon-generator, it is possible to prevent excessive temperature increase in the plasmon-generator. And then, such an element may be referred to as a surface evanescent light coupling type near-field light generator. Note, the near-field light is a sort of so-called electromagnetic field, which is formed around a substance, and has a physical property that can ignore a diffraction limit due to wavelengths of the light. The light having uniform wavelengths is irradiated to a microstructure body to form a near-field depending on a scale of the microstructure body. Thereby, it becomes possible to taper the light to a minimum region with a size of several tens of nm.

The head for thermally-assisted recording that can perform such heat application with the near-field light is configured to include a light waveguide, the plasmon-generator, and a magnetic pole for writing as principal elements thereof. The light waveguide is configured from oxide metals and/or nitride that introduce laser light. The plasmon-generator is configured from metals that generate plasmon. The magnetic pole for writing is formed of a magnetic material that generates a recording magnetic field.

And then, the thermally-assisted magnetic recording head that mounts such a plasmon-generator narrows a recording spot (track) width to enable the higher recording density to be realized.

Meanwhile, in order to suppress heat generation inside the plasmon-generator, materials with less plasmon loss should be selected as metals for generating the plasmon, which are materials of the plasmon-generator.

In the case when the heat generation inside the plasmon-generator is large, there is a threat not only that the magnetic head deforms (for example, protrusion of a tip part from the ABS) but also that the plasmon-generator itself may lose its shape due to migration of atoms of the material configuring the plasmon-generator. Accordingly, there is a concern that the head reliability is significantly affected. That is, in the case when the plasmon-generator deforms due to the heat generation, there is a threat that a preferred characteristic (heat application ability) is not obtained and a head characteristic is deteriorated.

In order to suppress heat generation, the plasmon-generator is preferably configured from a material with low dielectric loss å" (material with a large value of optical extinction coefficient k and a small value of refractive index n). This is because the loss is decreased when the plasmon is propagated, and as a result, the light being converted into the thermal energy in the plasmon-generator is reduced.

As specific materials of the plasmon-generator with less loss, Au, Ag, Cu, Al, and an alloy made of these metals are given.

However, among the materials, Cu is unsuitable for a wafer process and manufacture process in manufacturing the magnetic head since Cu has corrosion against alkali resolution.

In addition, Al is unsuitable for the magnetic head with many processes exposing in the atmosphere since Al has corrosion against alkali resolution and at the same time the surface thereof oxidizes easily.

Although Ag simple substance has corrosion against alkali resolution, in the case when Ag system materials are configured as alloy materials of AgPdCu or AgBi, high corrosion resistance and high thermostability are obtained and change of optical constant is reduced. The Ag system materials are known to be used as reflection film materials for DVDs, for example. However, there is a threat that Ag oxidizes and the optical property deteriorates since the film surfaces of the Ag system materials are exposed in the atmosphere under a high temperature environment for the magnetic head and wafer process usage purpose.

Au system materials have excellent oxidation resistance and corrosion resistance, and are preferable materials for the wafer process. However, the Au system materials have poor heat resistance and may deform when heat is applied since the Au system materials themselves are soft and migrate easily.

From the point of view, the U.S. Patent Application Publication No. 2011/205,863, as related art, discloses that a near-field light transducer is configured containing gold (Au) and at least one dopant. The dopant is at least one selected out of Cu, Rh, Ru, Ag, Ta, Cr, Zr, V, Pd, Ir, Co, W, Ti, Mg, Fe, or Mo, and a dopant content thereof is in a range of 0.5%-30%. Also, it is disclosed that the dopant can be a nanoparticle oxide of V, Zr, Mg, Ca, Al, Ti, Si, Ce, Y, Ta, W, or Th, or a nanoparticle nitride of Ta, Al, Ti, Si, In, Fe, Zr, Cu, W or B. According to the proposal, improvement of mechanical intensity, heat resistance and durability is achieved by adding an appropriate amount of the dopant to a base of gold (Au).

However, it is inevitable that values of an optical extinction coefficient k and a refractive index n of the element itself vary by adding the dopant. Only with a simple method in which the dopant is added to the entire plasmon-generator simply formed by Au, the degree of heat generation in the element due to the addition tends to become larger. In the above-discussed situation, it is difficult to say that optimization of a configuration of the plasmon-generator is achieved.

In addition, the above-described prior art discloses a number of elements, oxide particles and nitride particles as dopants that may be added. However, in order to achieve the optimization of the configuration of the plasmon-generator and decrease a heat generation amount of the entire plasmon-generator, it is necessary to discuss the optimization of the configuration of the plasmon-generator and optimization of compositions including dopant selection. Especially, it is necessary to optimize by narrowing an area of a dopant that should be added to match to the configuration of the plasmon-generator and elements to be added.

It is objective of the present invention, which is invented under such situations, to provide a plasmon-generator that can satisfy thermostability, optical characteristic, and the process stability and has extremely excellent heat dissipation performance and heat generation suppression effect. In other words, it is objective of the present invention to provide a configuration and a composition material of the plasmon-generator that especially can suppress plasmon loss low, have excellent heat dissipation performance and heat generation suppression effect, and suppress deformation due to heat.

Note, JP Laid-Open Patent Application Nos. 2012-22768 and 2011-53531, JP Patent No. 4,007,702 and JP Laid-Open Patent Application No. H4-165085 are given as other prior arts related to the present invention. Descriptions regarding the arts are briefly given below.

JP Laid-Open Patent Application No. 2012-22768 discloses a thermally-assisted magnetic recording head including a plasmon-generator formed of a non-magnetic layer that contains one or more of Au, Ag, Cu, Al, Ti, Ta, and Ge. However, the above-described disclosed configuration has a different configuration and usage purpose from those of the present invention.

JP Laid-Open Patent Application No. 2011-53531 discloses that in a near-field light waveguide device including a near-field light waveguide part configured from a complex with a configuration where both a metal and an inorganic oxide are three-dimensionally continuous, a near-field light excitation part introducing near-field light to one end of the near-field light waveguide part and a near-field light output part outputting the near-field light from the other end of the near-field light waveguide part, the metal is composed of one metal selected from a group of Au, Ag, Cu, Al, Ni, Co, Cr, Sn, and Pd, or an alloy of these. The prior art absolutely discloses only that the waveguide is configured from a complex of the metal and the inorganic oxide (configuration where the metal is filled in micropores holed in the inorganic oxide). That metal is different from a metal member configuring the plasmon-generator itself.

JP Patent No. 4,007,702 discloses a sputtering target material for thin film formation, a thin film formed thereof, an optical recording medium, and a technology in which the antiweatherability is improved while Pd and/or Cu is/are added to Ag to maintain a reflective index of the film. However, the above-described disclosed configuration has a different configuration and usage purpose from those of the present invention.

JP Laid-Open Patent Application No. H4-165085 describes plating for ornament such as Au—Ni, Au—Co and, Au—Pd. However, this disclosure discloses only regarding the noble metal plating for general ornament, and the disclosure has a different configuration and usage purpose from those of the present invention.

SUMMARY OF THE INVENTION

In order to solve the subjects, a plasmon-generator of the present invention is one includes a surface plasmon mode coupling portion that is coupled with light in a surface plasmon mode, a plasmon propagation part that propagates surface plasmon from the coupling portion, and a near-field light generating end surface that is positioned in a distal end part on the propagation part and that generates near-field light. The plasmon-generator includes a first configuration member including the near-field light generating end surface and a second configuration member joined and integrated with the first configuration member and not including the near-field light generating end surface. The first configuration member is configured to contain Au as a primary component and to contain any one or more elements selected from a group of Co, Fe, Sb, Nb, Zr, Ti, Hf, and Ta, and is configured so that a content percentage $X_1$ of the contained element is within a range between 0.2 at % or more and 2.0 at % or less, and the second configuration member is configured from Au.

Also, as a preferred embodiment of the plasmon-generator of the present invention, the content percentage $X_1$ is set within a range between 0.5 at % or more and 1.0 at % or less.

Also, as a preferred embodiment of the plasmon-generator of the present invention, the first configuration member is configured to contain Au as a primary component, and contains any one or more elements selected from a group of Co, Fe, and Sb.

Also, as a preferred embodiment of the plasmon-generator of the present invention, the first configuration member is configured to be disposed in a bar-shaped body shape on an entire region from the near-field light generating end surface to a rear end surface of the plasmon-generator in a longitudinal direction (X direction).

Also, as a preferred embodiment of the plasmon-generator of the present invention, the plasmon-generator is configured to have a configuration in which the second configuration member is laminated on the first configuration member.

Also, as a preferred embodiment of the plasmon-generator of the present invention, the first configuration member is configured to form the surface plasmon mode coupling portion, the plasmon propagation part and the near-field light generating end surface.

Also, as a preferred embodiment of the plasmon-generator of the present invention, the first configuration member is configured to form a bar-shaped protrusion part protruded from the second configuration member toward a near-field light generating end surface side of the plasmon-generator.

Also, as a preferred embodiment of the plasmon-generator of the present invention, the first configuration member is configured to form a portion of the plasmon propagation part and the near-field light generating end surface.

Also, as a preferred embodiment of the plasmon-generator of the present invention, a bottom part of the first configuration member and a bottom part of the second configuration member are configured to be joined together to form the same plane surface.

A thermally-assisted magnetic recording head of the present invention is one that includes a magnetic pole that generates a writing magnetic field from an end surface forming a portion of an air bearing surface opposing a magnetic recording medium, a waveguide through which light propagates, and a plasmon-generator that is coupled with the light propagating through the waveguide in a surface plasmon mode (does evanescent light coupling with the light). The plasmon-generator is configured to include the above configuration.

Also, as a preferred embodiment of the thermally-assisted magnetic recording head of the present invention, the plasmon-generator includes a first configuration member including the near-field light generating end surface and a second configuration member joined and integrated with the first configuration member and not including the near-field light generating end surface. The near-field light generating end surface of the first configuration member is configured to be exposed to an air bearing surface (ABS) which is a surface opposing a medium, and the second configuration member is configured not to be exposed to the ABS, and to be embedded in the head.

Also, as a preferred embodiment of the thermally-assisted magnetic recording head of the present invention, the plasmon-generator is configured to maintain a certain distance from the waveguide, to include a transmit portion for transmitting plasmon generated on a surface to the air bearing surface, and to generate near-field light from a near-field light generating end surface that forms a portion of the air bearing surface.

A head gimbal assembly of the present invention is configured to include the above thermally-assisted magnetic recording head and a suspension supporting the thermally-assisted magnetic recording head.

A magnetic recording device of the present invention is configured to a magnetic recording medium, the above thermally-assisted magnetic recording head, and a positioning device supporting the thermally-assisted magnetic recording head, and positioning the thermally-assisted magnetic recording head with respect to the magnetic recording medium.

DETAILED DESCRIPTION OF THE INVENTION

Prior to explaining embodiments of the present invention, terminologies used in the present specification are defined.

In a lamination structure or an element structure formed on an element formation surface of a slider substrate of a thermally-assisted magnetic recording head, from a perspective of a layer or element to be a reference, a substrate side is referred to as "lower (below)," and an opposite side is referred to as "upper (above)." In addition, in an embodiment of the thermally-assisted magnetic recording head, "X, Y and Z directions" are defined in some of the drawings as necessary.

Here, the Z axis direction corresponds to the above-described "up and down directions", +Z side corresponds to a trailing side, and −Z side corresponds to a leading side. The Y axis direction is a track width direction, and the X axis direction is a height direction or a depth direction. Moreover, some portions of the drawings are illustrated changing their scale in the upper and lower directions and the left and right directions to illustrate visibly so that the scale may be different from an actual scale.

Similarly, in descriptions of the thermally-assisted magnetic recording head, "side surfaces" of a waveguide disposed in the thermally-assisted magnetic recording head are end surfaces that surround the waveguide other than end surfaces perpendicular to a propagation direction (−X direction) of light propagating through the waveguide. Therefore, either an "upper surface" or a "lower surface" of the waveguide in the descriptions of the thermally-assisted magnetic recording head is one of the "side surfaces," and the "side surfaces" are surfaces which light propagating through the waveguide corresponding to a core is able to totally reflect off.

Note, in the following descriptions, the thermally-assisted magnetic recording head may be simply referred to as a magnetic recording head and magnetic head.

In addition, an air bearing surface 12a that is a surface opposing the magnetic recording medium may be simply referred to as an ABS 12a. In addition, a waveguide 41 is occasionally referred to as a core 41.

A thermally-assisted magnetic recording head according to one embodiment of the present invention is explained with reference to the drawings.

Note, the plasmon-generator according to the present invention is described below using a preferred example that is one in a state where the plasmon-generator is incorporated in the thermally-assisted magnetic recording head. However, the plasmon-generator is not particularly limited thereto and may be incorporated in another device that is combined to a waveguide to be used.

Figure 1:
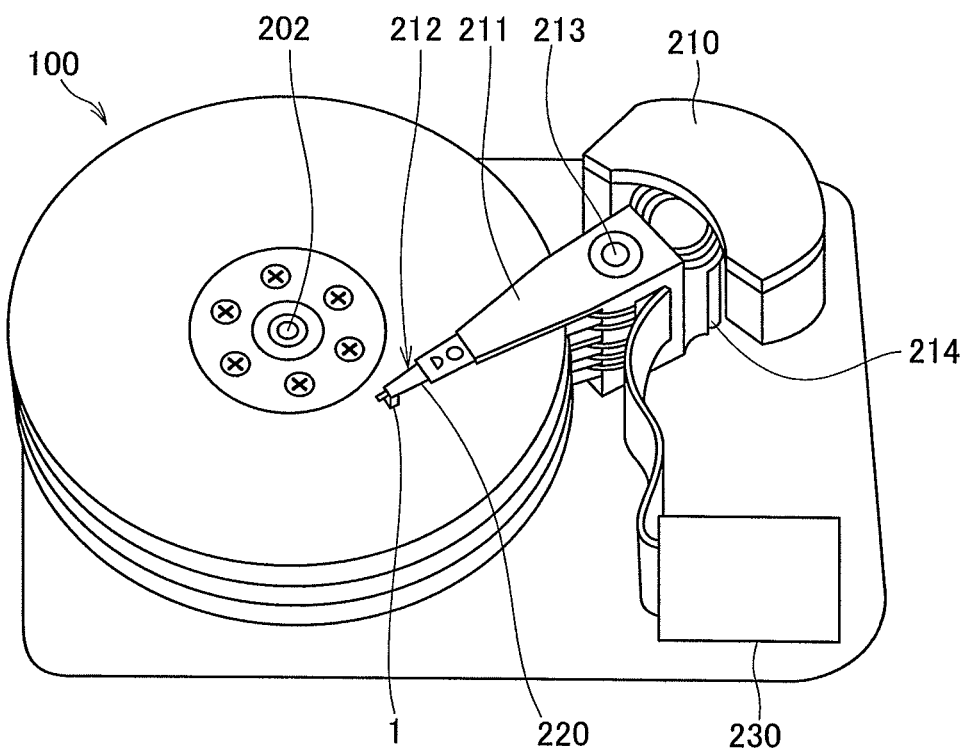
FIG. 1 is a perspective view schematically illustrating a magnetic recording device of an embodiment of the present invention.
Figure 2:
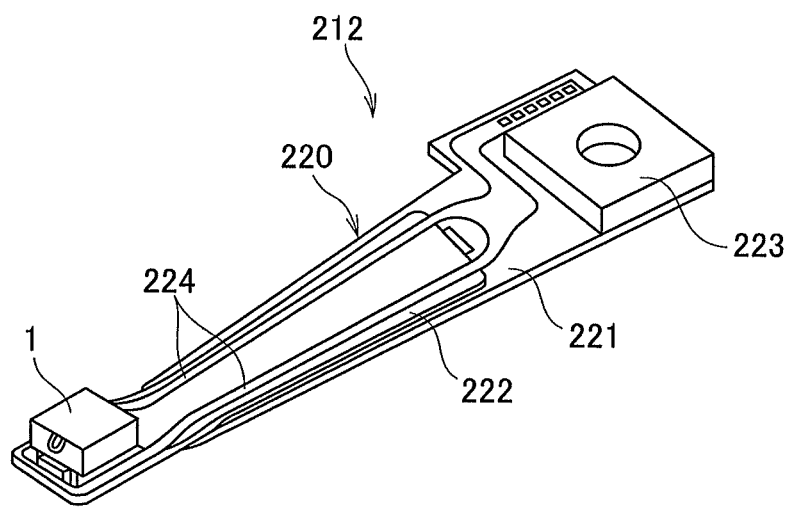
FIG. 2 is a perspective view schematically illustrating a head gimbal assembly (HGA) of an embodiment of the present embodiment.

FIG. 1 is a perspective view schematically illustrating a magnetic recording device of the present embodiment. FIG. 2 is a perspective view schematically illustrating a head gimbal assembly (HGA) of the present embodiment.

As illustrated in FIG. 1, a magnetic disk device as a magnetic recording device according to the present embodiment is provided with a plurality of magnetic disks 100, an assembly carriage device 210, head gimbal assemblies (HGA) 212, and a control circuit 230. The magnetic disks 100 rotate around a rotational shaft of a spindle motor 202. The assembly carriage device 210 is provided with a plurality of drive arms 211. The HGAs 212 each is attached to a tip part of each of the drive arms 211 and has the thermally-assisted magnetic recording head 1, which is a thin film magnetic head, according to the present embodiment. The control circuit 230 controls writing and reading operations of the thermally-assisted magnetic recording head 1 according to the present embodiment, and controls a light emission operation of a laser diode, which is a light source that generates laser light for aftermentioned thermally-assisted magnetic recording.

In the present embodiment, the magnetic disks 100, which are magnetic recording media, are for perpendicular magnetic recording and each has a structure in which a soft magnetic under layer, an intermediate layer, a recording layer (perpendicular magnetization layer), and a like are sequentially laminated above a disk substrate, for example.

The assembly carriage device 210 is a device for positioning the thermally-assisted magnetic recording head 1 on a track, which is formed on the magnetic disk 100 and on which recording bits are arrayed. In the assembly carriage device 210, the drive arms 211 are stacked in a direction along a pivot bearing shaft 213 and are angularly swingable by a voice coil motor (VCM) 214 centering around the pivot bearing shaft 213.

Note, the structure of the magnetic disk device of the present embodiment is not limited to the above-described structure but may include a single piece of each of the magnetic disk 100, the drive arm 211, the HGA 212, and the thermally-assisted magnetic recording head 1.

In the HGA 212 illustrated in FIG. 2, a suspension 220 is configured with a load beam 221, a flexure 222 that is firmly attached to the load beam 221 and has elasticity, and a base plate 223 provided at a base of the load beam 221. In addition, a wiring member 224 is provided on the flexure 222. The wiring member 224 is formed from a lead conductor and connection pads that are electrically connected to both sides of the lead conductor. The thermally-assisted magnetic recording head 1 according to the present embodiment is firmly attached to the flexure 222 at a tip part of the suspension 220 so as to oppose a surface of each of the magnetic disks 100 with a predetermined gap (flying height).

Further, an end of the wiring member 224 is electrically connected to a terminal electrode of the thermally-assisted magnetic recording head 1 according to the present embodiment.

Figure 3:
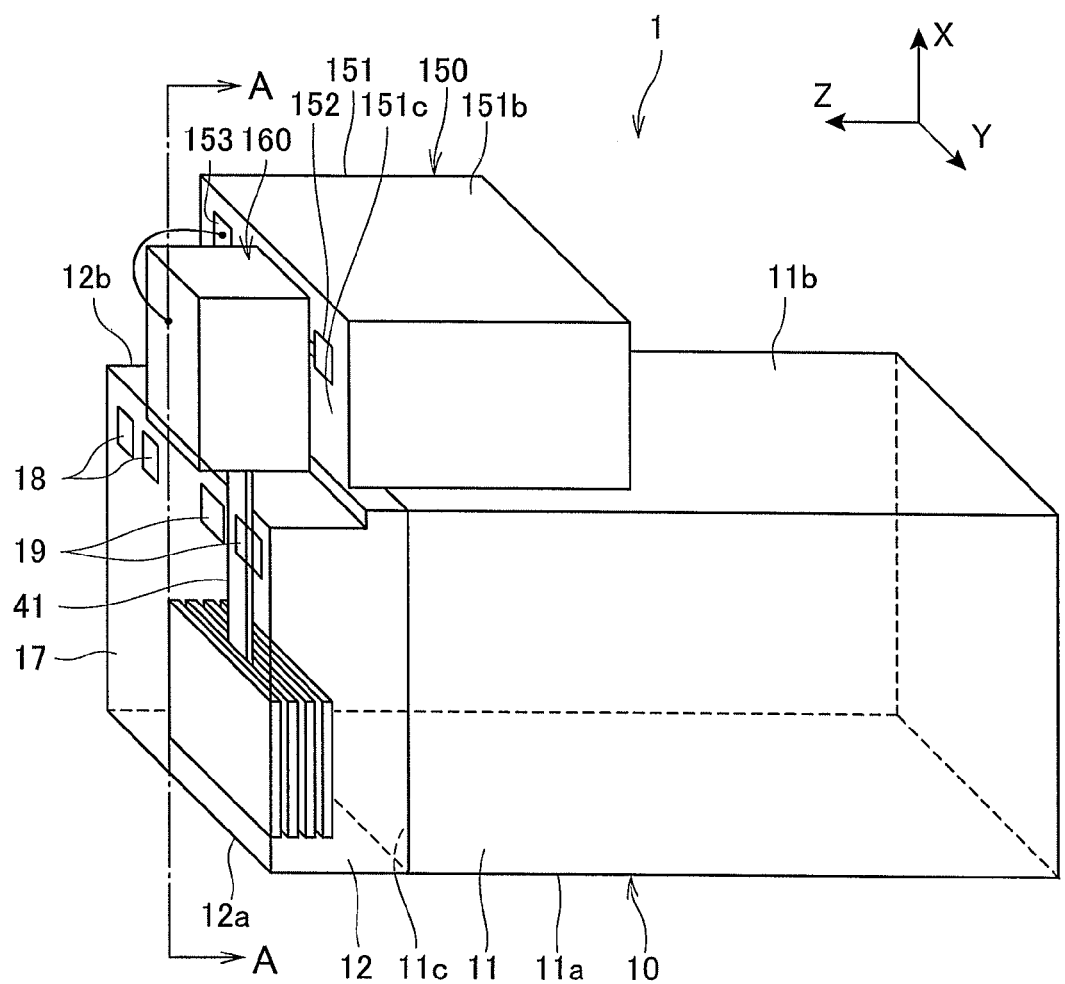
FIG. 3 is a perspective view illustrating a thermally-assisted magnetic recording head according to an embodiment of the present embodiment.
Figure 4:
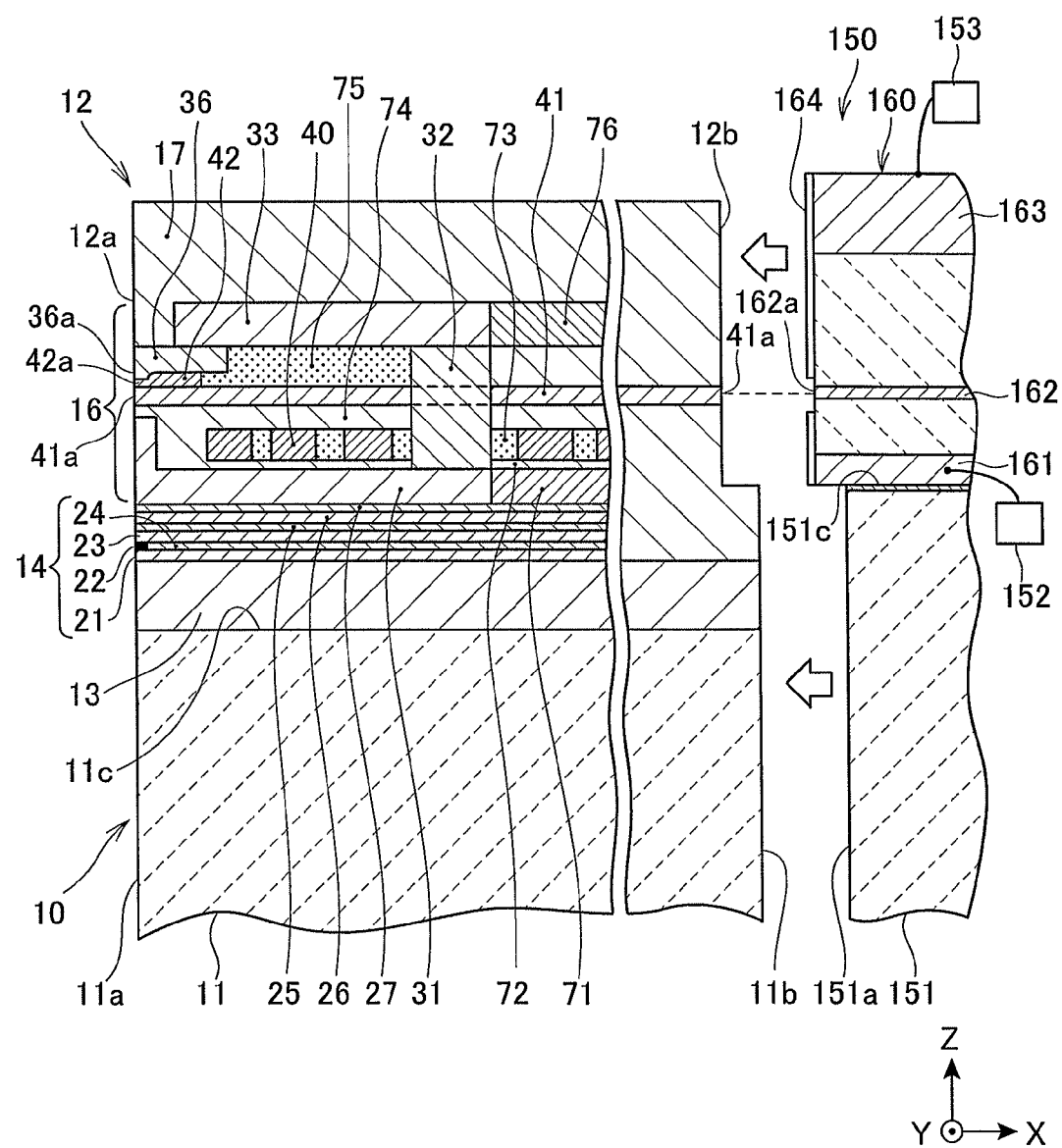
FIG. 4 is a cross-sectional view of the A-A line (XZ plane) in FIG. 3 that schematically illustrates a configuration of a main part of the thermally-assisted magnetic recording head according to an embodiment of the present invention.
Figure 5:
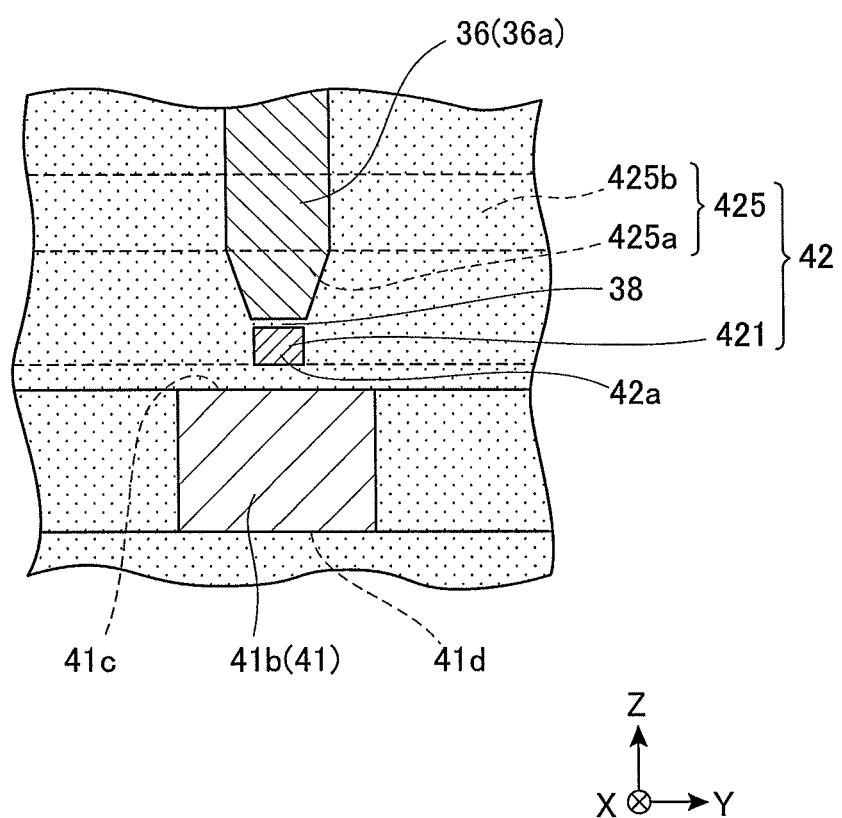
FIG. 5 is a front view of the thermally-assisted magnetic recording head of the present invention from the perspective of the air bearing surface (ABS) side.
Figure 6:
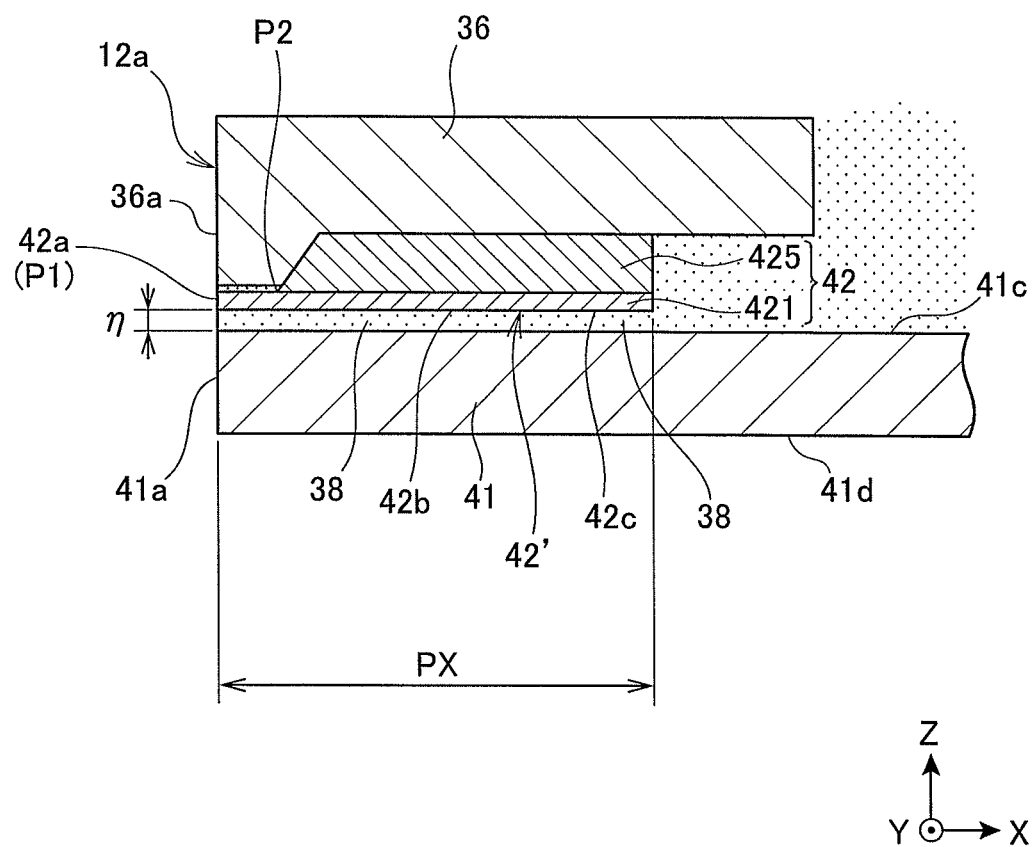
FIG. 6 is an enlarged cross-sectional view illustrating the mutual positional relationship among a plasmon-generator, and a main magnetic pole and a waveguide, etc. (existing in the vicinity of the plasmon-generator), which configure a main part of the thermally-assisted magnetic recording head of the present embodiment in FIG. 4.
Figure 7:
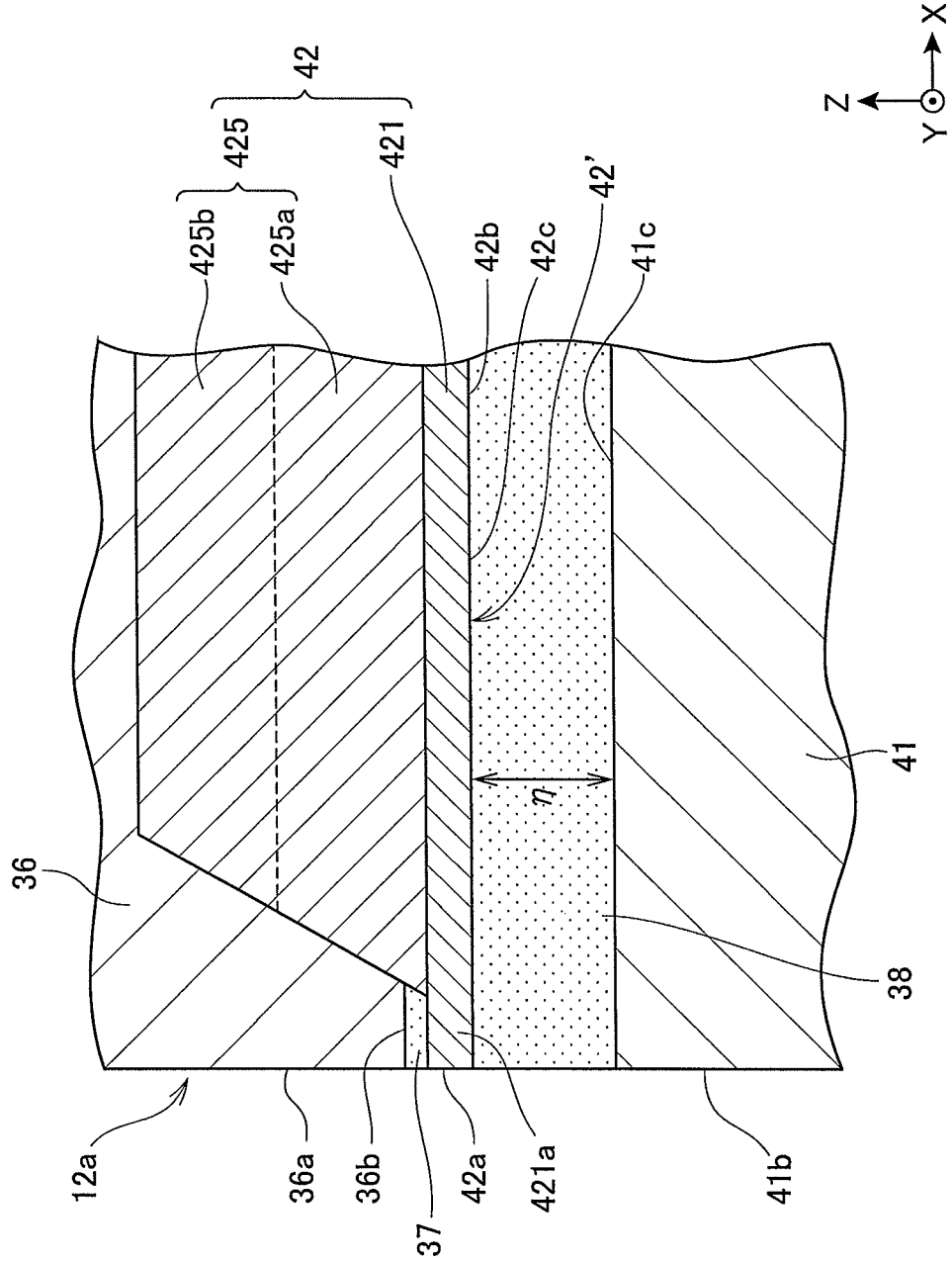
FIG. 7 is a cross-sectional view in which the vicinity of the ABS in FIG. 6 is further enlarged.
Figure 8:
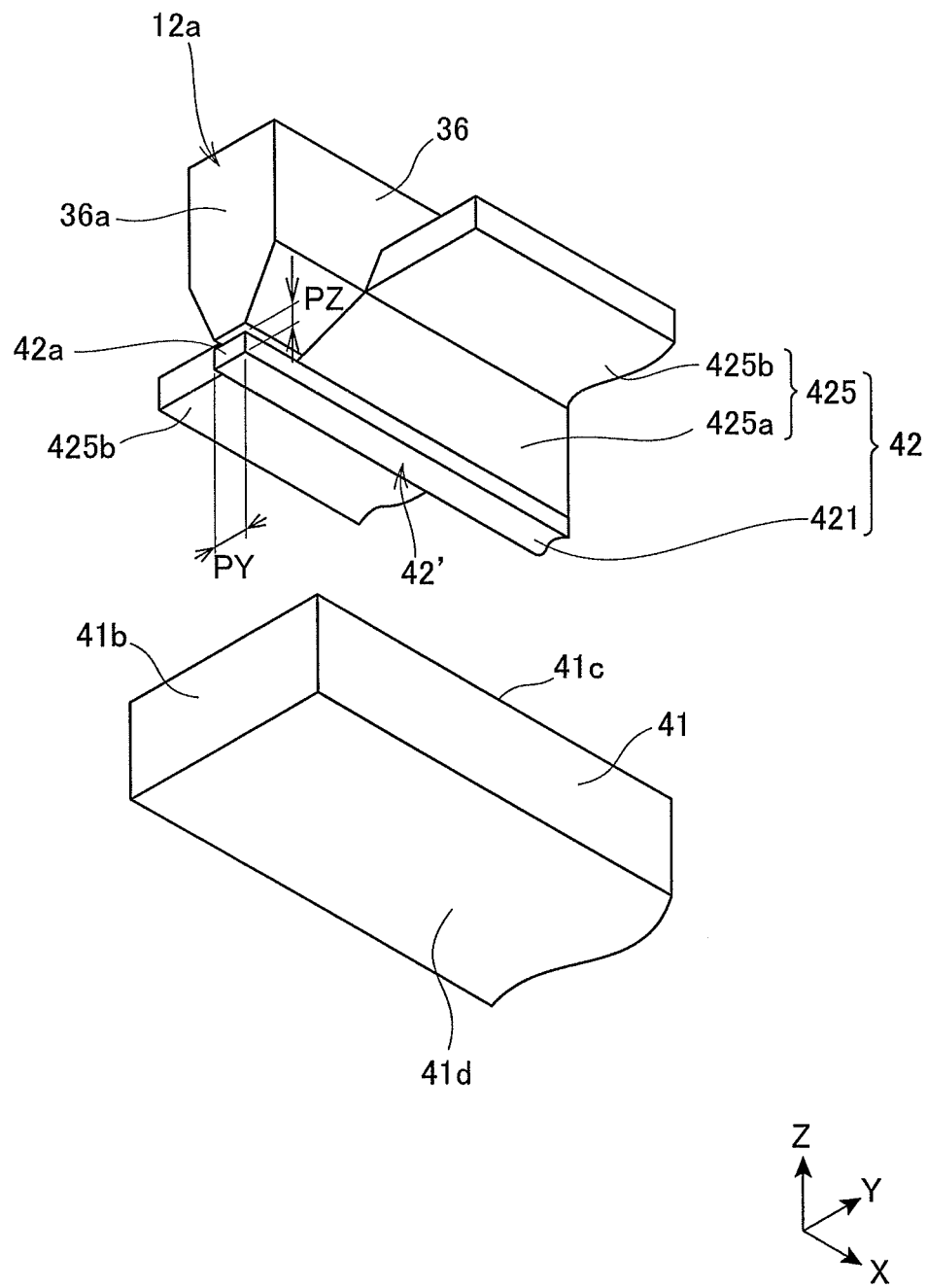
FIG. 8 is a perspective view depicted to easily understand the mutual positional relationship among the plasmon-generator, and the main magnetic pole and the waveguide, etc. (existing in the vicinity of the plasmon-generator in FIG. 6), which are the main part of the thermally-assisted magnetic recording head of the present embodiment.

Next, a description regarding a configuration of the thermally-assisted magnetic recording head 1 is given with reference to FIGS. 3-8. FIG. 3 is a perspective view illustrating the thermally-assisted magnetic recording head according to the present embodiment of the present invention. FIG. 4 is a cross-sectional view of the (XZ plane) in FIG. 3 that schematically illustrates a configuration of a main part of the thermally-assisted magnetic recording head according to the embodiment of the present invention. FIG. 5 is a front view of the thermally-assisted magnetic recording head of the present invention from the perspective of the ABS side. FIG. 6 is an enlarged cross-sectional view illustrating the mutual positional relationship among a plasmon-generator, and a main magnetic pole and a waveguide (existing in the vicinity of the plasmon-generator), which configure a main part of the thermally-assisted magnetic recording head. FIG. 7 is a cross-sectional view in which the vicinity of the ABS in FIG. 6 is further enlarged. FIG. 8 is a perspective view depicted to easily understand the mutual positional relationship among the plasmon-generator, and the main magnetic pole and the waveguide, etc., (existing in the vicinity of the plasmon-generator in FIG. 6), which are the main part of the thermally-assisted magnetic recording head of the present embodiment.

As illustrated in FIG. 3, the thermally-assisted magnetic recording head 1 includes a slider 10 and a light source unit 150. FIG. 4 illustrates a state in which the slider 10 and the light source unit 150 are separated.

The slider 10 is configured with a slider substrate 11 formed of a ceramic material such as aluminum oxide.titanium carbide ($Al_2O_3$.TiC) or the like in a substantially cuboid shape and a head part 12 formed above the slider substrate 11.

The slider substrate 11 is configured with an air bearing surface 11a (occasionally referred to as ABS) that opposes the magnetic disk 100, a back surface 11b on the opposite side to the air bearing surface 11a, and four surfaces that connect the air bearing surface 11a and the back surface 11b.

One of the four surfaces that connect the air bearing surface 11a and the back surface 11b is configured as an element formation surface 11c. The element formation surface 11c has a positional relation that is perpendicular to the air bearing surface 11a, and the head part 12 is formed on the element formation surface 11c.

The head part 12 has an air bearing surface 12a that opposes the magnetic disk 100 and a back surface 12b on the opposite side to the air bearing surface 12b. The air bearing surface 12a is parallel to the air bearing surface 11a of the slider substrate 11 and forms the same surface. Generally, the air bearing surface 11a is processed such that the slider 10 can obtain an appropriate flying height with respect to the magnetic disk 100.

During the actual writing and reading, the thermally-assisted magnetic recording head 1 hydro-dynamically flies above the surface of the rotating magnetic disk 100 with a predetermined flying height. At this time, the air bearing surface 12a of the magnetic head opposes the surface of the magnetic recording layer of the magnetic disk 100 with an appropriate magnetic spacing. In this situation, the reading of data signal and the magnetic writing of recording data are performed.

The light source unit 150 includes a laser diode 160 and a supporting member 151 in a cuboid shape as illustrated in FIG. 3 and FIG. 4. The laser diode 160 is a light source that emits laser light, and the supporting member 151 supports the laser diode 160. The supporting member 151 is configured with a joining surface 151a, a back surface 151b on the opposite side to the joining surface 151a, and four surfaces that connect the joining surface 151a and the back surface 151b.

One of the four surfaces that connect the joining surface 151a and the back surface 151b is configured as a light source installation surface 151c, and the joining surface 151a is configured as a surface joined to the back surface 11b of the slider substrate 11.

The light source installation surface 151c is formed perpendicular to the joining surface 151a and parallel to the element formation surface 11c. The laser diode 160 is mounted on the light source installation surface 151c. Note, the thermally-assisted magnetic recording head 1 according to the present embodiment may be in a state in which the laser diode 160 is directly mounted on the slider 11 without using the light source unit 150.

As illustrated in FIG. 4, the head part 12 is configured with an insulating layer 13 that is arranged above the element formation surface 11c, a reproducing head 14 that is configured from a multilayer film in which layers are sequentially laminated on the insulating layer 13, a recording head 16 and a protective layer 17. The protective layer 17 is formed of insulating materials.

The reproducing head 14 is configured with a lower shield layer 21 arranged on the insulating layer 13, an MR element 22 arranged on the lower shield layer 21, an upper shield layer 23 arranged on the MR element 22, and an insulating layer 24 arranged between the lower shield layer 21 and the upper shield layer 23 around the MR element 22.

The lower shield layer 21 and the upper shield layer 23 function to shield an external magnetic field, and the lower shield layer 21 and the upper shield layer 23 are magnetic layers with a thickness of approximately 0.5-3 μm that are formed by a frame plating method, a spattering method or the like, for example, and are configured from a soft magnetic material such as NiFe (permalloy), FeSiAl (sendust), CoFeNi, CoFe, FeN, FeZrN, CoZrTaCr or the like, or a multilayer film or the like formed of these materials, for example.

One end part of the MR element 22 is arranged on the air bearing surface 12a. The MR element 22 is a magnetically sensitive part that senses a signal magnetic field using the MR effect. A giant magnetoresistive effect (GMR) element, a tunnel-magnetoresistive effect (TMR) element or the like are used as the MR element 22, for example. The GMR element may be a so-called current in plane (CIP) type in which a sense current for magnetic signal detection flows in a direction substantially parallel to each surface configuring the GMR element, and may be also a so-called current perpendicular to plane (CPP) type in which a sense current flows in a direction substantially perpendicular to each surface configuring the GMR element.

As one example of the MR element 22, when the MR element 22 is a TMR element, the MR element 22 has a structure in which the following are sequentially laminated: an antiferromagnetic layer formed of, for example, IrMn, PtMn, NiMn, RuRhMn or the like having a thickness of approximately 5-15 nm; a magnetization pinned layer that has a structure in which two ferromagnetic layers formed of, for example, CoFe or the like sandwich a nonmagnetic metal layer formed of Ru or the like and of which a magnetization direction is pinned by the antiferromagnetic layer; a tunnel barrier layer formed of a nonmagnetic dielectric material that is a metal film formed of Al, AlCu or the like having a thickness of approximately 0.5-1 nm oxidized by oxygen introduced into a vacuum device or by natural oxidation; and a magnetization free layer that is configured with a double layer film formed of a layer of CoFe or the like having a thickness of approximately 1 nm and a layer of NiFe or the like having a thickness of approximately 3-4 nm, which are ferromagnetic materials, and that achieves tunnel exchange coupling with the magnetization pinned layer with the tunnel barrier layer therebetween.

When the MR element 22 is the TMR element or the GMR element of the CPP type, the lower shield layer 21 and the upper shield layer 23 may also function as electrodes for letting a sense current flow to the MR element 22. When the MR element 22 is the GMR element of the CIP type, insulating films are disposed respectively between the MR element 22 and the lower shield layer 21 and between the MR element 22 and the upper shield layer 23, and two leads for applying a sense current to the MR element 22 are disposed between the insulating films.

The head part 12 is configured with an insulating layer 25 that is arranged above the upper shield layer 23, an intermediate shield layer 26 that is formed on the insulating layer 25, and an insulating layer 27 that is arranged on the intermediate shield layer 26.

The intermediate shield layer 26 functions to shield the MR element 22 from a magnetic field generated by the recording head 16. The intermediate shield layer 26 is formed of a soft magnetic material. Note, the disposition of the insulating layer 25 and the intermediate shield layer 26 may be omitted.

The recording head 16 is configured for so-called a perpendicular magnetic recording. The recording head 16 is configured with a return yoke layer 31 that is arranged on the insulating layer 27, a linkage layer 32 (also referred to as back via) that is arranged in a recessed position from the air bearing surface 12a on the return yoke layer 31, and an insulating layer 71 that is arranged in the vicinity of the return yoke layer 31 on the insulating layer 27. The return yoke layer 31 and the linkage layer 32 are formed of a soft magnetic material. Note, upper surfaces of the return yoke layer 31 and the insulating layer 71 are planarized.

The recording head 16 is configured further with insulating layers 72 that are arranged on the return yoke layer 31 and the insulating layer 71, and a coil 40 that is arranged on the insulating layers 72. The coil 40 is formed in a plane-spiral shape winding around the linkage layer 32. A current is applied to the coil 40 to generate a magnetic field corresponding to information to be recorded on the magnetic disk 100, which is a magnetic recording medium. The coil 40 is formed of a conductive material such as, for example, copper or the like.

The recording head 16 is configured with insulating layers 73 that are arranged between and in the vicinity of winding lines of the coil 40 and in the vicinity of the linkage layer 32, insulating layers 74 that are arranged on the insulating layers 72 in the vicinity of the insulating layers 73, and insulating layers 74 that are arranged on the coil 40 and the insulating layers 73. Note, upper surfaces of the linkage layer 32, the coil 40 and the insulating layer 73 are planarized. An insulating layer 75 is formed on the insulating layer 74 with the waveguide 41 therebetween. The insulating layer 74 and the insulating layer 75 are formed into a continued integrated object. Note, a tunnel-shaped elongated hole structure is formed inside the linkage layer 32 such that the waveguide 41 can penetrate in a linear manner.

The recording head 16 is configured further with a yoke layer 33 that is arranged on the linkage layer 32 and the insulating layer 75, and an insulating layer 76 that is arranged in the vicinity of the yoke layer 33 arranged on the insulating layer 75. Note, upper surfaces of the yoke layer 33 and the insulating layer 76 are planarized. The yoke layer 33 is formed of a soft magnetic material.

The main magnetic pole 36 is linked to the yoke layer 33 on the air bearing surface 12a side. The main magnetic pole 36 includes an end surface 36a that is arranged on the air bearing surface 12a. The main magnetic pole 36 is preferably formed of a soft magnetic material having a higher saturation magnetic flux density than the yoke layer 33, and is preferably formed of a soft magnetic material such as, for example, FeNi, FeCo, FeCoNi, FeN, FeZrN or the like, which are iron-based alloy materials having Fe as a main component. Note, the thickness of the main magnetic pole 36 in the Z axis direction is preferably set to approximately 0.1-0.8 μm. Furthermore, the width of the main magnetic pole 36 in the Y axis direction is preferably set to approximately 0.2-0.3 μm.

In the members configuring the recording head 16, the return yoke layer 31, the linkage layer 32, the yoke layer 33 and the main magnetic pole 36 configure a so-called magnetic path through which a magnetic flux corresponding to a magnetic field generated by applying a current to the coil 40 passes. While the main magnetic pole 36 is arranged to make the magnetic flux corresponding to the magnetic field generated by applying the current to the coil 40 pass through the main magnetic pole 36, the main magnetic pole 36 generates a recording magnetic field to record information to the magnetic disk 100 by the perpendicular magnetic recording method.

Further, the recording head 16 includes a core that forms the waveguide 41 through which laser light propagates and a cladding that is formed in its vicinity. In the present embodiment, the cladding is configured from an insulating layer surrounding the periphery of the waveguide 41. Note, in the following descriptions, the waveguide 41 is occasionally referred to as a core 41 as discussed above or they are described side by side.

As illustrated in FIG. 4, the core 41 (waveguide 41) is configured to extend in a perpendicular direction (X direction) to the air bearing surface 12a. The core 41 includes an incident end 41a as illustrated in the figure. Laser light that is emitted from the laser diode 160 and enters the incident end 41a propagates through the core. The core 41 is formed by a dielectric body material to propagate the laser light. The cladding layer configuring the periphery of the core 41 is formed by a dielectric body material, and is configured from a material with a smaller refractive index than that of the core 41. The cladding layer corresponds to the insulating layers 74, 75 and the like illustrated in FIG. 4, for example.

For example, in case when the wavelength $ë_L$ of the laser light is 600 nm and when the cladding layer configuring the periphery of the core 41 is formed of $SiO_2$ (silicon dioxide; n=1.46), the core 41 (waveguide 41) can be formed of $Al_2O_3$ (alumina; n=1.63). Furthermore, when the cladding layer is formed of, for example, $Al_2O_3$ (n=1.63), the core 41 (waveguide 41) may be formed of $SiO_XN_Y$ (n=1.7-1.85), $Ta_2O_5$ (n=2.16), $Nb_2O_5$ (n=2.33), TiO (n=2.3-2.55) or $TiO_2$ (n=2.3-2.55). When the core 41 (waveguide 41) is formed of such materials, propagation loss of the laser light can be suppressed low due to excellent optical characteristics that the materials themselves have.

Further, the core 41 (waveguide 41) may have a multilayer structure of dielectric materials in which the layers positioned in the upper portion have the higher refractive index n. For example, such a multilayer structure is realized by sequentially laminating dielectric materials of which the values of a composition ratio (X, Y) in $SiO_XN_Y$ are appropriately varied.

Furthermore, in the present embodiment, the recording head 16 includes the plasmon-generator 42 contained so as to be substantially tightly attached to the lower part (−Z direction portion) of the main magnetic pole 36. In addition, a lower surface of the plasmon-generator 42 is arranged to oppose an upper surface 41c of the core 41 (waveguide 41) with the buffer layer 38 (see FIG. 6) therebetween with a certain gap.

The plasmon-generator 42 is a heating element that generates near-field light from an end part of tip and heats the magnetic disk 100 with the near-field light. In the present embodiment, the plasmon-generator 42 is arranged under the main magnetic pole 36 (on −Z side) with respect to the main magnetic pole 36, which is a so-called leading side arrangement, in the vicinity of the air bearing surface 12a; however, the plasmon-generator 42 is not limited to this configuration, and may be arranged above the main magnetic pole 36 (on +Z side) with respect to the main magnetic pole 36, which is a so-called trailing side arrangement.

In addition, a cooling layer (not illustrated) for cooling the plasmon-generator 42 may be formed in the vicinity of the plasmon-generator 42. The cooling layer is formed of a non-magnetic material having a large thermal conductive ratio such as, for example, SiC or the like.

The present invention has characteristics in the configuration of the plasmon-generator 42 and a composition configuration based on the configuration. That is, the configuration configured from plural members configuring the plasmon-generator 42 and a component composition of each of the members are characteristic. Descriptions regarding the characteristics are given below.

As illustrated in FIG. 4, the protective layer 17 is arranged so as to cover the recording head 16. As illustrated in FIG. 3, the head part 12 further includes a pair of terminals 18 that are arranged on an upper surface of the protective layer 17 and that are electrically connected to the MR element 22, and a pair of terminals 19 that are arranged on the upper surface of the protective layer 17 and that are electrically connected to the coil 40. These terminals 18 and 19 are electrically connected to a plurality of pad-shape terminals of the wiring member 224 illustrated in FIG. 2.

As illustrated in FIG. 4, the laser diode 160 has a multilayer structure that includes a lower electrode 161, an active layer 162 and an upper electrode 163. On two cleavage surfaces of the multilayer structure, reflection layers 164 are disposed which light totally reflects off to excite oscillation. On the reflection layer 164, an aperture from which laser light emits is disposed at the position of the active layer 162 including an emission center 162a.

The light source unit 150 includes a terminal 152 that is arranged on the light source installation surface 151c and that is electrically connected to a lower electrode 161, and a terminal 153 that is arranged on the light source installation surface 151c and that is electrically connected to an upper electrode 163. These terminals 152 and 153 are electrically connected to a plurality of pad-shape terminals of the wiring member 224 illustrated in FIG. 2. When a predetermined voltage is applied to the laser diode 160 from the terminals 152 and 153, laser light is radiated from the emission center 162a of the laser diode 160. It is preferred that laser light emitted from the laser diode 160 is polarized light of TM mode of which oscillation direction of an electric field is perpendicular to a surface of the active layer 162.

As illustrated in FIG. 4, the light source unit 150 is firmly attached to the slider 10 by joining the joining surface 151a of the supporting member 151 and the back surface 11b of the slider substrate 11. Positions of the laser diode 160 and the core 41 are determined such that laser light emitted from the laser diode 160 enters the incident end 41a of the core 41.

Next, descriptions are given regarding a configuration of the plasmon-generator 42, which is a main part of the present invention, according to a first embodiment and a composition configuration based on the configuration with reference to FIGS. 5-8.

Explanation for Plasmon-Generator 42 According to First Embodiment

As illustrated in FIG. 6, the plasmon-generator 42 according to the present invention is configured with a surface plasmon mode coupling portion 42c that can be coupled with light propagating through the waveguide 41 (propagating in the –X direction in the illustrated example) arranged to oppose a surface plasmon mode coupling portion 42c in the surface plasmon mode (do surface evanescent coupling with the light), a plasmon propagation part 42b that can propagate surface plasmon in the ABS 12a direction (–X direction) from the coupling portion 42c, and a near-field light generating end surface 42a that generates near-field light and is positioned on the –X direction end part of the plasmon propagation part 42b. The near-field light generating end surface 42a exists on the so-called air bearing surface (ABS) 12a.

The waveguide 41 includes a front end surface 41b near the air bearing surface 12a, an upper surface 41c, a lower surface 41d, and two side surfaces (not illustrated) as illustrated in FIGS. 5 and 6 besides the incident end 41a illustrated in FIG. 4.

The surface plasmon mode coupling portion 42c of the plasmon-generator 42 corresponds to a surface positioned to oppose the upper surface 41c of the waveguide 41, which is an area positioned in the deep side of the plasmon-generator 42 (upstream side of traveling of light) as illustrated in FIG. 6, for example.

The surface plasmon mode coupling portion 42c is explained further in detail. The surface plasmon mode coupling portion 42c is defined as "a part where, when light propagating through the waveguide 41 totally reflects off an interface between the waveguide 41 and the buffer layer 38, penetration of evanescent light to the buffer layer 38 side is generated, the penetrated evanescent light couples to surface plasmon, which is collective oscillation of charge in the vicinity of an opposing surface 42' of the plasmon-generator 42, and the surface plasmon is excited on the plasmon-generator 42".

As described above, the surface plasmon excited on the plasmon-generator 42 propagates through the plasmon propagation part 42b (lower surface formed by a convex part, an edge or the like) to the near-field light generating end surface 42a, and near-field light is generated from the near-field light generation part of the near-field light generating surface 42a positioned on a surface opposing the magnetic recording medium. The plasmon propagation part 42b is a plasmon-generator part that receives a function propagating the excited surface plasmon to the near-field light generating end surface 42a. Generally, the plasmon propagation part 42b corresponds to the vicinity of the opposing surface 42' opposing the waveguide 41 in the plasmon-generator. Note, it is difficult to distinguish a clear border region between the surface plasmon mode coupling portion 42c and of the plasmon propagation part 42b. There is less significance to distinguish the region clearly. In either case, to exert the function of the plasmon-generator of the present invention, the surface plasmon mode coupling portion 42c and the plasmon propagation part 42b exist as necessary requirements. Generally, the surface plasmon mode coupling portion 42c exists on the X direction side (upstream side of traveling of light) than the plasmon propagation part 42b. In addition, both of them are portions of the opposing surface 42' and their functions can be realized by overlapping.

As described above, the surface plasmon mode coupling portion 42c and the plasmon propagation part 42b corresponds to the opposing surface 42' of the plasmon-generator 42 arranged to oppose the upper surface 41c of the waveguide 41 with the buffer layer 38 therebetween. The opposing surface 42' is configured in a state where the opposing surface 42' extends in the X direction as illustrated in the figure. Note, an gap ç between the opposing surface 42' of the plasmon-generator 42 and the upper surface 41c of the waveguide 41 (see FIGS. 6 and 7) is configured to lead from the air bearing surface 12a side to the deep side (X direction) and to maintain a certain gap. In addition, a refractive index of a material configuring the buffer layer 38 is set to be smaller than that of the material configuring the waveguide 41.

The plasmon-generator 42 according to the first embodiment is configured with a first configuration member 421 including the near-field light generating end surface 42a, and a second configuration member 425 that is joined and integrated with the first configuration member 421 and doesn't include the near-field light generating end surface as illustrated in FIGS. 6 and 8, for example.

The first configuration member 421 includes the near-field light generating end surface 42a and has a shape of a bar-shaped body in rectangular cross sections arranged to oppose the waveguide 41, and the first configuration member 421 is configured to include the above-discussed surface plasmon mode coupling portion 42c and the plasmon propagation part 42b.

On the other hand, as illustrated in FIGS. 6 and 8, for example, the second configuration member 425 includes a base main body 425a that is joined and integrated with the first configuration member 421 and of which cross sections have irregular hexagonal shapes as if a quadrilateral is combined with a trapezoid, and wing parts 425b that are formed to extend respectively in the +Y direction and –Y direction from both upper part ends of the base main body 425a. The near-field light generating end surface 42a does not exist in the second configuration member 425. That is, as illustrated in FIG. 6, a most front end part P2 of the second configuration member 425 in the −X direction is not exposed to the ABS 12a, which is so-called the air bearing surface, and stays at a position recessed in the depth direction (+X direction) in comparison with a most front end part P1 of the first configuration member 421 in the −X direction (same position as the near-field light generating end surface 42a). Moreover, to describe in detail, as illustrated in FIGS. 7 and 8, only the tip end surface 42a of the first configuration member 421 extends to the ABS 12a, which is the air bearing surface, and the end surface configures the near-field light generating end surface 42a. And then, a tip end part of the main magnetic pole 36 is formed on an upper part of the second configuration member 425 so as to cover the base main body 425a of the second configuration member 425. As illustrated in FIG. 7, a lower part end 36b of the main magnetic pole 36 is configured so as to cover the protruded tip end part 421a of the first configuration member 421 in the vicinity of the ABS with a nonmagnetic insulating material layer 37 therebetween. The nonmagnetic insulating material layer 37 is configured from a nonmagnetic insulating material such as alumina, for example. As described above, the lower part end 36b of the main magnetic pole 36 is configured so as to cover the protruded tip end part 421a of the first configuration member 421 with the nonmagnetic insulating material layer 37 therebetween. Thereby, a gap in the Z direction between a generation position of a writing magnetic field by the main magnetic pole 36 and the near-field light generating end surface 42a of the first configuration member 421 can be narrowed to approach both of them. As a result, extremely efficient thermally-assisted magnetic recording can be achieved.

According to this technology, since light propagating through the waveguide 41 is not directly irradiated to the plasmon-generator 42, it is possible to prevent excessive temperature increase. And then, such a plasmon-generator 42 is referred to as a surface evanescent light coupling type near-field light generator. Note, near-field light is a sort of so-called electromagnetic field, which is formed around a substance, and has a physical property that can ignore a diffraction limit due to wavelengths of the light. The light having uniform wavelengths is irradiated to a microstructure body to form a near-field depending on a scale of the microstructure body. Thereby, it becomes possible to taper the light to a minimum region with a size of several tens of nm.

Further, an additional description is given with reference to FIGS. 5 and 6, out of the so-called cladding layer that surrounds the periphery of the core 41 (waveguide 41), a part that is arranged between the upper surface 41c (evanescent light generation surface) of the core 41 (waveguide 41) and the opposing surface 42' of the plasmon-generator 42 configures the buffer portion 38 with a smaller refractive index than that of the core 41 as discussed above.

In addition, both a size PY of the plasmon-generator 42 in the track width direction (Y direction) on the air bearing surface 12a illustrated in FIG. 8 and a size PZ of the plasmon-generator 42 in the Z direction on the air bearing surface 12a are sufficiently smaller than a wavelength of laser light propagating through the core 41. It is desirable that both of the sizes are within a range of 10-100 nm, for example.

In addition, it is desirable that a length PX (see FIG. 6) of the plasmon-generator 42 in the X direction is within a range of 0.6-4 im, for example.

In addition, both a length in the X direction of a portion that opposes the upper surface 41c of the core 41 (waveguide 41) generating evanescent light on the opposing surface 42' of the plasmon-generator 42 and the interval ç between the opposing surface 42' and the upper surface 41c are important parameters for realizing appropriate excitation and propagation of surface plasmon. It is preferable that the interval ç is within a range of 10-100 nm.

The plasmon-generator 42 according to the first embodiment has, in addition to a configuration characteristic where the plasmon-generator 42 includes the two members of the first configuration member 421 and the second configuration member 425, a characteristic that the first configuration member 421 and the second configuration member 425 are configured to be formed from respective different preferred compositions.

That is, the first configuration member 421 configuring the plasmon-generator 42 is configured to contain of Au as a primary component and any one or more elements selected from a group of Co, Fe, Sb, Nb, Zr, Ti, Hf, and Ta. The first configuration member 421 is configured so that a content percentage $X_1$ of the contained element is within a range between 0.2 at % (atom %) or more and 2.0 at % (atom %) or less, more preferably, within a range between 0.5 at % (atom %) or more and 1.0 at % (atom %) or less.

When the above-described content percentage $X_1$ is less than 0.2 at %, a disadvantage that makes it difficult to realize the effect of the present invention tends to occur. In addition, when the content percentage $X_1$ exceeds 0.2 at %, a grain size tends to easily enlarge as well as a disadvantage tends to occur which the added element deposits on the surface and the aggregation from the deposition of the additive element occurs easily. Out of the elements mentioned above, it is preferable to use Co, Fe, and Sb in particular.

In addition, due to the relationship with the composition of the second configuration member 425, which is described later, the content percentage $X_1$ of the first configuration member 421 may be approximately 0.2-0.4 at %. In this case, the composition change in the vicinity of junction surfaces of the first configuration member 421 and the second configuration member 425 can be extremely reduced, which is useful because an optical property change on the interface can be moderated, for example.

On the other hand, the second configuration member 425 that configures the plasmon-generator 42 is configured from Au. The recitation "Configured from Au" described here means that Au with high purity is used positively to configure the second configuration member 425 from an Au simple substance and means to intentionally exclude a case of adding other elements.

The above-described plasmon-generator 42 configured from the first configuration member 421 and the second configuration member 425 is used to satisfy operation effects of the present invention, that is, the thermostability, optical characteristic, and the process stability, and the plasmon-generator with extremely excellent heat dissipation performance and heat generation suppression effect can be realized. Especially, in the first embodiment, since the first configuration member 421 including the near-field light generating end surface 42a to be extremely high temperature contains predetermined elements at predetermined percentages, thermostability can be improved. In addition, the second configuration member 425 exerts a heat sink effect, functions to dissipate heat accumulated inside the plasmon-generator, and suppresses the deformation of the plasmon-generator due to the heat accumulation.

Note, in the plasmon-generator formed by an Au alloy disclosed in the conventional art (U.S. Patent Application Publication No. 2011/0,205,863), 2nk becomes high and the degree of the heat generation of the entire element becomes higher in comparison with a plasmon-generator configured from an Au simple substance, for example. On the other hand, in the first embodiment of the present invention, the above-described plasmon-generator 42 configured from the first configuration member 421 and the second configuration member 425 is used. A portion where light couples is mainly the first configuration member 421 composed of an Au alloy. The degree of heat generation of the Au alloy is higher in comparison with the Au simple substance. However, the heat generation can be suppressed extremely effectively as the entire plasmon-generator 42 since the second configuration member 425 that allows the first configuration member 421 to exert a heat sink effect is provided. Of course, the vicinity of the near-field light generating end surface 42a that is requested to have the thermostability is configured from the first configuration member 421 and the thermostability is ensured compositionally.

Explanation for Plasmon-Generator 42 According to Second Embodiment

Figure 9:
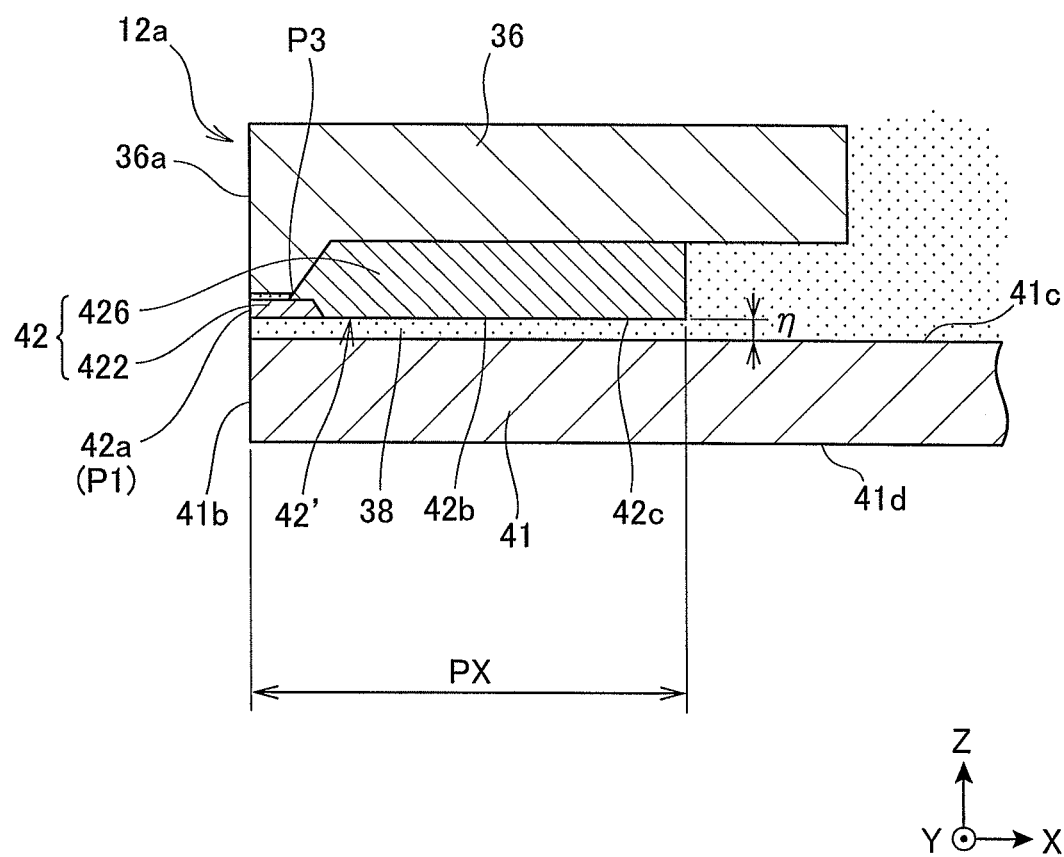
FIG. 9 corresponds to FIG. 6, and another plasmon-generator configuration is depicted therein.
Figure 10:
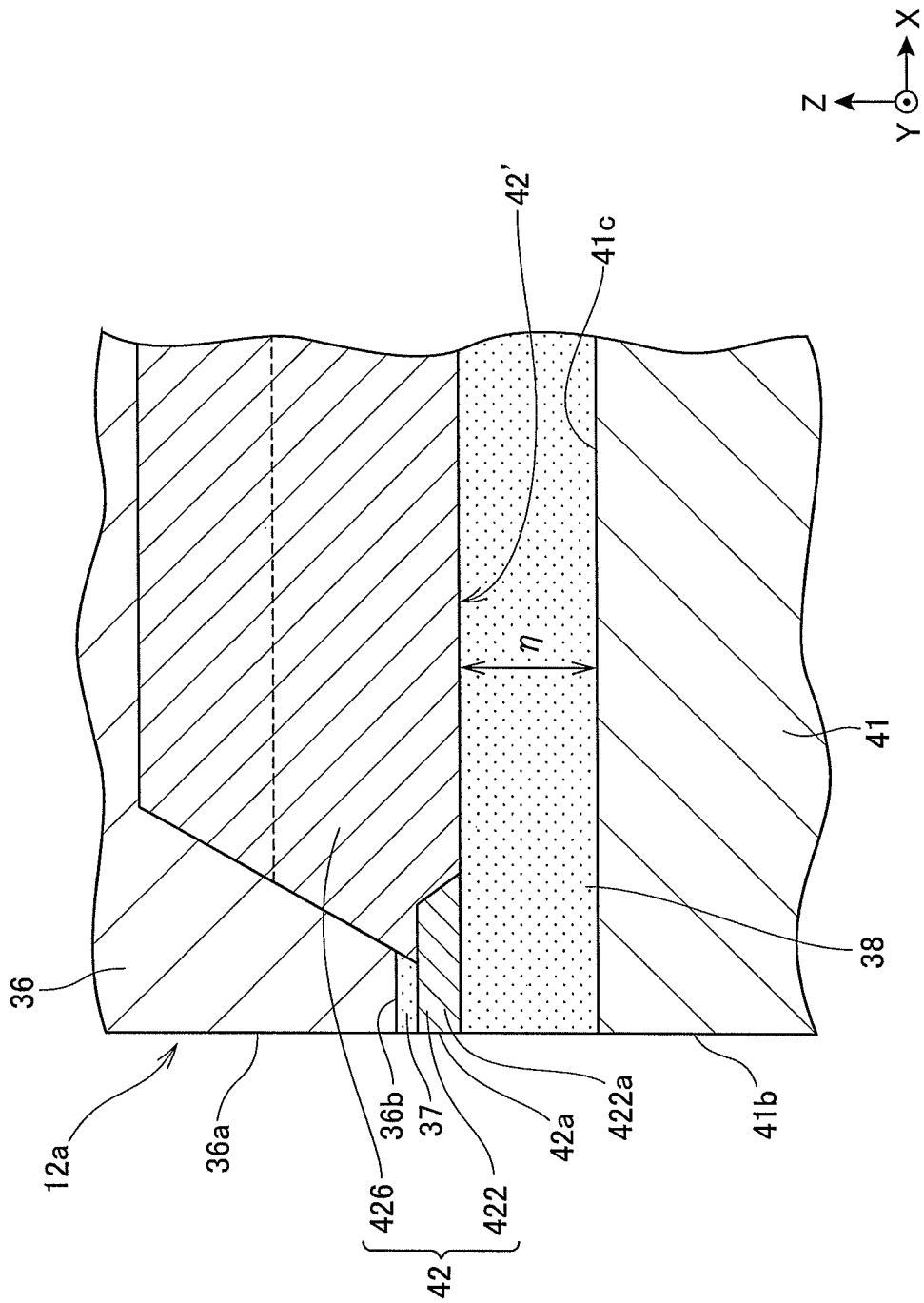
FIG. 10 corresponds to FIG. 7, and is a cross-sectional view in which the vicinity of the ABS in FIG. 9 is further enlarged.
Figure 11:
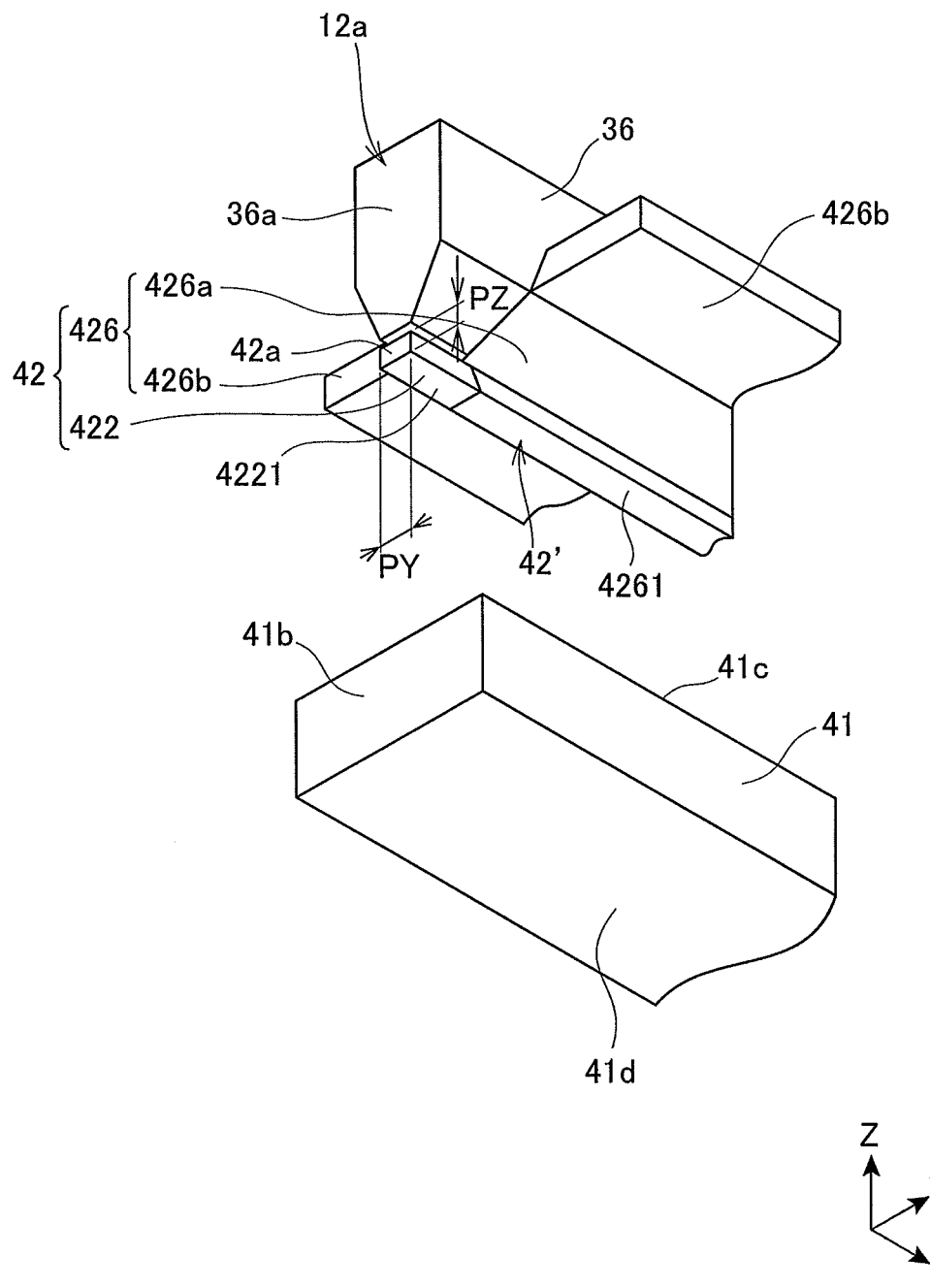
FIG. 11 is a perspective view depicted to easily understand the mutual positional relationship among the plasmon-generator, and the main magnetic pole and the waveguide, etc. (existing in the vicinity of the plasmon-generator in FIG. 9), which are the main part of the thermally-assisted magnetic recording head of the present embodiment.

As illustrated in FIGS. 9-11 (especially in FIG. 9), a plasmon-generator 42 of a second embodiment according to the present invention is configured with the surface plasmon mode coupling portion 42c that can be coupled with light propagating through the waveguide 41 (propagating in the −X direction in the illustrated example) arranged in an oppose manner the same as the above-described first embodiment in the surface plasmon mode (do evanescent light coupling with light), the plasmon propagation part 42b that can propagate surface plasmon from the coupling portion and the near-field light generating end surface 42a that generates near-field light and is positioned on a distal end part of the plasmon propagation part 42b. The near-field light generating end surface 42a exists on the so-called air bearing surface (ABS) 12a.

A different point of the plasmon-generator 42 of the second embodiment from the plasmon-generator 42 of the first embodiment is that, as illustrated in FIG. 9, a first configuration member 422 including the near-field light generating end surface 42a is formed only in the vicinity of the ABS, and that most of the plasmon-generator 42 is formed by a second configuration member 426. Accordingly, the surface plasmon mode coupling portion 42c and most of the plasmon propagation part 42b exist on the opposing surface 42' of the second configuration member opposing the waveguide 41.

The plasmon-generator 42 of the second embodiment is explained further in detail.

The second configuration member 426, as illustrated in FIG. 11, is configured with a base main body 426a that has irregular cross sections as if, for example, respective quadrilaterals are added to an upper side and a lower side of a trapezoid and are combined with the trapezoid, and wing parts 426b that are formed to extend respectively in the +Y direction and −Y direction from both upper part sides of the base main body 426a. Furthermore, the second configuration member 426 does not include the near-field light generating end surface 42a. That is, as illustrated in FIG. 9, a most front part P3 of the second configuration member 426 in the −X direction is not exposed to the ABS, which is so-called an air bearing surface, and is at a position recessed in the depth direction (+X direction) in comparison with a most front part P1 of the first configuration member 422 in the −X direction (same position as the near-field light generating end surface 42a).

On the other hand, the first configuration member 422, as illustrated in FIGS. 9 and 11, is configured to be joined to the second configuration member 426 so as to extend from a substantially distal end of the plasmon propagation part 42b of the second configuration member 426 in the ABS 12a direction (−X direction). That is, the first configuration member 422 is configured to form a bar-shaped protrusion part protruded from the second configuration member 426 toward the near-field light generating end surface side of the plasmon-generator. And then, as illustrated in FIG. 11, a bottom part 4221 of the first configuration member 422 and a bottom part 4261 of the second configuration member 426 are joined together to form the same plane surface, and form the opposing surface 42' opposing the waveguide 41.

Moreover, to describe in detail, as illustrated in FIGS. 9 and 11, only the tip end surface of the first configuration member 422 protrudes to the ABS 12a, and the end surface configures the near-field light generating end surface 42a. And then, a tip end part of the main magnetic pole 36 is formed on a tip end of the second configuration member 426 so as to cover the base main body 426a of the second configuration member 426. As illustrated in FIG. 10, a lower part end 36b of the main magnetic pole 36 is configured to cover the protruded tip end part 422a of the first configuration member 422 in the vicinity of the ABS 12a with the nonmagnetic insulating material layer 37 therebetween. The nonmagnetic insulating material layer 37 is configured from a nonmagnetic insulating material such as alumina, for example. The lower part end 36b of the main magnetic pole 36 is configured so as to cover the protruded tip end part 422a of the first configuration member 422 with the nonmagnetic insulating material layer 37 therebetween. Thereby, a gap in the Z direction between a generation position of a writing magnetic field by the main magnetic pole 36 and the near-field light generating end surface 42a of the first configuration member 422 can be narrowed. As a result, extremely efficient thermally-assisted magnetic recording can be achieved.

As in the above-discussed first embodiment, the plasmon-generator 42 according to the second embodiment has, in addition to a configuration characteristic where the plasmon-generator 42 includes the two members, a characteristic where the first configuration member 422 and the second configuration member 426 are configured to be formed from respective different preferred compositions.

That is, the first configuration member 422 configuring the plasmon-generator 42 is configured to contain Au as a primary component and to contain any one or more elements selected from a group of Co, Fe, Sb, Nb, Zr, Ti, Hf, and Ta. The first configuration member 422 is configured so that a content percentage $X_1$ of the contained element is within a range between 0.2 at % (atom %) or more and 2.0 at % (atom %) or less, more preferably, within a range between 0.5 at % (atom %) or more and 1.0 at % (atom %) or less. When the content percentage $X_1$ is less than 0.2 at %, a disadvantage that makes it difficult to realize the effect of the present invention tends to occur. In addition, when the content percentage $X_1$ exceeds 0.2 at %, a grain size tends to easily enlarge as well as a disadvantage tends to occur which the added element deposits on the surface and the aggregation from the deposition of the additive element occurs easily. Out of the elements mentioned above, it is preferable to use Co, Fe, and Sb in particular. In addition, due to the relationship with the composition of the second configuration member 426, which is described later, the content percentage $X_1$ of the first configuration member 422 may be approximately 0.2-0.4 at %. In this case, the composition change in the vicinity of junction surfaces of the first configuration member 422 and the second configuration member 426 can be extremely reduced, which is useful because an optical property change on the interface can be moderated, for example.

On the other hand, the second configuration member 426 that configures the plasmon-generator 42 is configured from Au. The recitation "Configured from Au" described here means that Au with high purity is used positively to configure the second configuration member 426 from an Au simple substance and means to intentionally exclude a case of adding other elements.

The above-described plasmon-generator 42 configured from the first configuration member 422 and the second configuration member 426 is used to satisfy operation effects of the present invention, that is, the thermostability, optical characteristic, and the process stability, and the plasmon-generator with extremely excellent heat dissipation performance and heat generation suppression effect can be realized. Especially, in the second embodiment, since the first configuration member 422 including the near-field light generating end surface 42a to be extremely high temperature contains predetermined elements at predetermined percentages, thermostability can be improved. In addition, the second configuration member 426 with the excellent optical characteristics formed of an Au simple substance exerts a suppression effect of the heat generation resulting from the plasmon propagation since the second configuration member 425 occupies most of the part where the light couples, that is, the surface plasmon mode coupling portion 42c, and most of the plasmon propagation part 42b.

Note, as discussed above, in the plasmon-generator formed by only the Au alloy disclosed in the conventional art (U.S. Patent Application Publication No. 2011/0,205,863, for example), 2nk becomes high and the degree of the heat generation of the entire element becomes higher in comparison with a plasmon-generator configured from an Au simple substance, for example. On the other hand, in the second embodiment of the present invention, the plasmon-generator 42 configured from the first configuration member 422 and the second configuration member 426 is used. A portion where light couples and most of the plasmon propagation part are configured from the second configuration member 426 formed of the Au simple substance with the high heat generation suppression effect. The heat generation can be suppressed extremely effectively as the entire plasmon-generator 42 since the vicinity of the near-field light generating end surface 42a that is requested to have the thermostability is configured from the first configuration member 422 formed of the Au alloy with the excellent thermostability.

Note, the plasmon-generator 42 of the present invention is not limited to the above-described preferable first embodiment and second embodiment, various embodiments may be adopted within the scope defied in the claims.

In addition, as discussed above, a case of a so-called leading side arrangement, that is, the plasmon-generator 42 is arranged under the main magnetic pole 36 (on −Z side) with respect to the main magnetic pole 36, which is a so-called leading side arrangement in the vicinity of the air bearing surface 12a in the present embodiment; however, the present invention is not limited to this configuration. A so-called trailing side arrangement, that is, the plasmon-generator 42 is arranged above the main magnetic pole 36 (on +Z side) with respect to the main magnetic pole 36, may also be applicable.
<Principle of Near-Field Light Generation and Principle of Thermally-Assisted Magnetic Recording using Near-Field Light>

Moreover, explanations regarding a principle of near-field light generation according to the present embodiment and a principle of the thermally-assisted magnetic recording using near-field light are given with reference to FIG. 6.

The laser light emitted from the laser diode 160 (see FIG. 4) propagates through the waveguide 41 (core 41) and reaches the vicinity of the buffer portion 38. Here, when laser light totally reflects off the interface between the waveguide 41 (core 41) and the buffer portion 38, evanescent light penetrating into the buffer portion 38 is generated. Then, surface plasmon polariton mode is induced as evanescent light and a fluctuation of charges on at least the opposing surface 42' of the outer surfaces of the plasmon-generator 42 are coupled with each other (surface plasmon mode coupling portion 42c). Thereby, when the coupling to the evanescent light generated from the upper surface 41c of the waveguide 41 (core 41) occurs on at least the opposing surface 42', the surface plasmon is excited.

Note, more precisely, since the surface plasmon that is elementary excitation is coupled to electromagnetic wave in this system, surface plasmon polariton is excited. However, hereinafter, the surface plasmon polariton is referred to as surface plasmon as abbreviation.

The surface plasmon exited on the opposing surface 42' of the plasmon-generator 42 propagates towards the near-field light generating end surface 42a on the air bearing surface 12a side along a propagation portion of the opposing surface 42'. As a result, the surface plasmon, which is in other words an electric field, is focused on the near-field light generating end surface 42a and near-field light is generated from the near-field light generating end surface 42a (synonymous with the near-field light generation part).

Note, the propagation portion is not limited to a convex part functioning as a transmit portion, and may have a so-called edge shape with a sharp bottom part.

The near-field light generated from the near-field light generating end surface 42a as described above heats a portion of the magnetic recording layer of the magnetic disk 100. Thereby, a coercive force of the portion of the magnetic recording layer decreases. In the thermally-assisted magnetic recording, a recording magnetic field is applied from the main magnetic pole 36 to the portion of the magnetic recording layer where the coercive force has decreased as described above to record magnetic information. It becomes able to perform the thermally-assisted magnetic recording after the above-described steps proceed.

EXAMPLE

Specific examples are described and further detailed description regarding the present invention will be given below.

First Example

Description of an example regarding the composition of the first configuration member will be given below.

First, various types of first configuration member samples in a predetermined shape were made by respectively adding 0.5 at % of Co, Nb, Ti, and Zr as additive elements in Au matrixes.

For each of the samples, an annealing treatment was performed at 250° C. for three hours. After the annealing treatment, a surface roughness Ra of each of the samples was measured as well as a degree of enlargement of a grain size and presence of aggregation of each of the samples were observed by atomic force microscope (AFM) observation.

Note, the presence of aggregation means a state where a grain size enlarges remarkably, that is, a state where a grain of which size is significantly larger than sizes of surrounding particles exists.

Table 1, which is described below, illustrates the result.

TABLE 1

(Ra, Enlargement of Grain Size and Aggregation after Adding 0.5 at %)

| Sample No. | Additive Element | Surface Roughness Ra (nm) | Enlargement of Grain Size | Aggregation |
|---|---|---|---|---|
| I-1 | N/A | 1.05 | Yes, and Large degree | Yes |
| I-2 | Co | 0.61 | No | No |
| I-3 | Nb | 0.76 | Yes, and degree to be observed | No |
| I-4 | Ti | 0.7 | Yes, and degree to be observed partially | No |
| I-5 | Zr | 0.68 | Yes, and degree to be observed partially | No |

According to the result illustrated in Table 1, in the case of Au simple substance to which no element is added, the surface roughness Ra after the annealing increased and the grain size enlargement with a large degree were observed. The aggregation was also observed.

On the other hand, it was observed that, in the case when the prescribed elements illustrated in Table 1 were added, the increases of the surface roughnesses Ra after the annealing were suppressed. In addition, the degrees of the grain size enlargement were low. Especially, the grain size enlargement in adding Co did not occur. No aggregation was also observed. In addition, the tendency illustrated in the above-described Table 1 was observed: the result without a disadvantage occurs in the same manner as the result illustrated in Table 1 until the additive amount was decreased to 0.2 at % of additive amount. Table 1-2, which is described below, illustrates the specific experiment result in the case of 0.2 at % of Co additive amount.

TABLE 1-2

(Ra, Enlargement of Grain Size and Agglomeration after Adding 0.2 at %)

| Sample No. | Additive Element | Surface Roughness Ra (nm) | Enlargement of Grain Size | Aggregation |
|---|---|---|---|---|
| I-2-1 | Co | 0.72 | Yes, and degree to be observed partially | No |

Next, in the cases of the Co addition and Nb addition in the above-described Table 1, each of the additive amounts was increased to 1.0 at %, 2.0 at % and 3.0 at %, and evaluation judgments in the same manner as described above were performed. Tables 2, 3 and 4, which are described below, illustrate the results.

TABLE 2

(Ra, Enlargement of Grain Size and Aggregation after adding 1.0 at %)

| Sample No. | Additive Element | Surface Roughness Ra (nm) | Enlargement of Grain Size | Aggregation |
|---|---|---|---|---|
| II-2 | Co | 0.63 | No | No |
| II-3 | Nb | 0.74 | Middle Degree | No |

TABLE 3

(Ra, Enlargement of Grain Size and Aggregation after adding 2.0 at %)

| Sample No. | Additive Element | Surface Roughness Ra (nm) | Enlargement of Grain Size | Aggregation |
|---|---|---|---|---|
| III-2 | Co | 0.65 | No | No |
| III-3 | Nb | 0.7 | No | No |

TABLE 4

(Ra, Enlargement of Grain Size and Agglomeration after adding 3.0 at %)

| Sample No. | Additive Element | Surface Roughness Ra (nm) | Enlargement of Grain Size | Aggregation |
|---|---|---|---|---|
| IV-2 | Co | 0.69 | No | Yes |
| IV-3 | Nb | 0.78 | No | Yes |

When the additive amount exceeds 2.0 at % and was 3.0 at %, as a result, a disadvantage occurred which the surface roughness Ra after the annealing was increased modestly and the aggregation was observed. Note, regarding the Nb addition, when the additive amount was modestly larger, that is, the additive amount was increased to 2.0 at %, suppression of the surface roughness Ra and the enlargement of grain size after the annealing was observed.

Note, experiments the same as described above were performed for Fe and Sb in addition to the above-described additive elements specified specifically. The same results as those of the above-described additive element Co were obtained.

According to the above-described results, it was observed that it is preferable that the first configuration member which includes the near-field light generating end surface that is requested to have thermostability is configured to contain Au as a primary component and to contain an element such as Co, Fe, Sb, Nb, Zr, Ti, Hf, Ta, and the like, and to have a content percentage $X_1$ within a range between 0.2 at % or more and 2.0 at % or less.

Second Example

Next, the first configuration member composed of Au as a primary component and contenting 1.0 at % of Co and the second configuration member composed of an Au simple substance were used, and the plasmon-generator 42 (first example sample) according to the first embodiment as illustrated in FIGS. 6-8 and the plasmon-generator 42 (second example sample) according to the second embodiment as illustrated in FIGS. 9-11 were made. In addition, as a comparative example, a plasmon-generator of the comparative example (comparative example sample), which has the same shape as described above and all region were configured from Au containing 1.0 at % of Co, was made.

The three types of samples were used and left in a high temperature chamber (environmental temperature 300° C.) for 24 hours and deformation degrees of the plasmon-generators were evaluated. It was observed that realization levels of an effect suppressing the deformation of the plasmon-generators were excellent in the following order: first example sample≥second example sample≥comparative example sample.

The advantages of the present invention are evident by the above described results. That is, the plasmon-generator of the present invention is the plasmon-generator that is configured with the surface plasmon mode coupling portion that can be coupled with light in the surface plasmon mode, the plasmon propagation part that can propagate the surface plasmon from that coupling portion and the near-field light generating end surface that generates near-field light and is positioned in the distal end part on that propagation part. The plasmon-generator includes the first configuration member including the near-field light generating end surface and the second configuration member joined and integrated with that first configuration member and not including the near-field light generating end surface. The first configuration member is configured to contain Au as a primary component and to contain any one or more elements selected from a group of Co, Fe, Sb, Nb, Zr, Ti, Hf, and Ta, and is configured so that a content percentage $X_1$ of that contained element is within a range between 0.2 at % or more and 2.0 at % or less, and the second configuration member is configured from Au. Accordingly, the plasmon-generator of the present invention can satisfy the thermostability, optical characteristic, and the process stability, and the heat dissipation performance and heat generation suppression effect are extremely excellent.

What is claimed is:

1. A plasmon-generator for use in a thermally assisted magnetic recording head including a waveguide that propagates light and the plasmon-generator that generates near-field light by coupling with light propagated through the waveguide in a surface plasmon mode, the plasmon-generator comprising:
an opposing surface that includes a surface plasmon mode coupling portion that is coupled with light propagated through the waveguide in a surface plasmon model, and a plasmon propagation part that propagates surface plasmon from the coupling portion, and that is opposite to the waveguide;
a near-field light generating end surface that is positioned in a distal end part on the propagation part and that generates the near-field light,
a first configuration member including the near-field light generating end surface; and
a second configuration member joined and integrated with the first configuration member and not including the near-field light generating end surface,
the first configuration member is configured to contain Au as a primary component and to contain any one or more elements selected from a group of Co, Fe, Sb, Nb, Zr, Ti, Hf, and Ta, and is configured so that a content percentage $X_1$ of the contained element is within a range between 0.2 at % or more and 2.0 at % or less, and
the second configuration member consists essentially of Au.

2. The plasmon-generator according to claim 1, wherein the content percentage $X_1$ is within a range between 0.5 at % or more and 1.0 at % or less.

3. The plasmon-generator according to claim 1, wherein the first configuration member contains Au as a primary component, and contains any one or more elements selected from a group of Co, Fe, and Sb.

4. The plasmon-generator according to claim 1, wherein the first configuration member is disposed in a bar-shaped body shape on an entire region from the near-field light generating end surface to a rear end surface of the plasmon-generator in a longitudinal direction (X direction).

5. The plasmon-generator according to claim 4, wherein the plasmon-generator has a configuration in which the second configuration member is laminated on the first configuration member.

6. The plasmon-generator according to claim 4, wherein the first configuration member is configured with the surface plasmon mode coupling portion, the plasmon propagation part and the near-field light generating end surface.

7. The plasmon-generator according to claim 1, wherein the first configuration member is configured to form a bar-shaped protrusion part protruded from the second configuration member toward a near-field light generating end surface side of the plasmon-generator.

8. The plasmon-generator according to claim 7, wherein the first configuration member is configured with a portion of the plasmon propagation part and the near-field light generating end surface.

9. The plasmon-generator according to claim 7, wherein a bottom part of the first configuration member and a bottom part of the second configuration member are joined together to form the same plane surface.

10. A thermally-assisted magnetic recording head, comprising:
a magnetic pole that generates a writing magnetic field from an end surface forming a portion of an air bearing surface opposing a magnetic recording medium;
a waveguide through which light propagates; and
a plasmon-generator that is coupled with the light propagating through the waveguide in a surface plasmon mode (does evanescent light coupling with the light), wherein
the plasmon-generator includes the configuration of claim 1.

11. The thermally-assisted magnetic recording head according to claim 10, wherein
the plasmon-generator includes a first configuration member including the near-field light generating end surface and a second configuration member joined and integrated with the first configuration member and not including the near-field light generating end surface, wherein
the near-field light generating end surface of the first configuration member is exposed to an air bearing surface (ABS) which is a surface opposing a medium, and
the second configuration member is not exposed to the ABS, and embedded in the head.

12. The thermally-assisted magnetic recording head according to claim 10, wherein
the plasmon-generator maintains a certain distance from the waveguide, includes a transmit portion for transmitting plasmon generated on a surface to the air bearing surface, and generates near-field light from the near-field light generating end surface that forms a portion of the air bearing surface.

13. A head gimbal assembly, comprising:
the thermally-assisted magnetic recording head according to claim 10; and
a suspension supporting the thermally-assisted magnetic recording head.

14. A magnetic recording device, comprising:
a magnetic recording medium;
the thermally-assisted magnetic recording head according to claim 10; and
a positioning device supporting the thermally-assisted magnetic recording head, and positioning the thermally-assisted magnetic recording head with respect to the magnetic recording medium.

* * * * *